United States Patent
Hierl et al.

(10) Patent No.: US 12,142,801 B2
(45) Date of Patent: Nov. 12, 2024

(54) PURGING SYSTEM AND USE THEREOF IN AN ENERGY SYSTEM

(71) Applicant: HPS Home Power Solutions GmbH, Berlin (DE)

(72) Inventors: Andreas Hierl, Berlin (DE); Renaldo Schönfeldt, Berlin (DE); Gunnar Schneider, Wildau (DE); Jonas Schulte, Berlin (DE)

( * ) Notice: Subject to any disclaimer, the term of this patent is extended or adjusted under 35 U.S.C. 154(b) by 598 days.

(21) Appl. No.: 17/416,002

(22) PCT Filed: Dec. 18, 2019

(86) PCT No.: PCT/EP2019/086014
§ 371 (c)(1),
(2) Date: Jun. 18, 2021

(87) PCT Pub. No.: WO2020/127527
PCT Pub. Date: Jun. 25, 2020

(65) Prior Publication Data
US 2022/0115681 A1  Apr. 14, 2022

(30) Foreign Application Priority Data
Dec. 20, 2018 (DE) ............. 10 2018 133 201.7

(51) Int. Cl.
*H01M 8/04223* (2016.01)
*C25B 15/08* (2006.01)

(52) U.S. Cl.
CPC ......... *H01M 8/04231* (2013.01); *C25B 15/08* (2013.01)

(58) Field of Classification Search
CPC .................... H01M 8/04231; C25B 15/08
See application file for complete search history.

(56) References Cited

U.S. PATENT DOCUMENTS

| 9,570,768 B2* | 2/2017 | Araki ............... H01M 8/04201 |
| 2002/0094469 A1* | 7/2002 | Yoshizumi .......... H01M 8/0662 |
| | | 429/513 |

(Continued)

FOREIGN PATENT DOCUMENTS

| EP | 3346532 | 7/2018 |
| WO | WO 2017/089466 | 6/2017 |

(Continued)

*Primary Examiner* — Matthew J Merkling
(74) *Attorney, Agent, or Firm* — Pandiscio & Pandiscio (57) ABSTRACT

The invention relates, inter alia, to a purging system, which is provided for purging at least one energy source device and/or at least one energy sink device of an energy system, comprising a purging device, which is provided in such a way that the purging device is able to produce a discharge volumetric flow (42) containing hydrogen during a purging process. The aim of the invention is to further advantageously modify a purging system of the type in question in order to avoid explosion hazards due to hydrogen in the discharge volumetric flow after a purging process, by means of economical measures of simple design. This aim is achieved, according to the invention, in that the purging system has a mixing device (44) downstream of the purging device in the flow direction of the discharge volumetric flow (42), which mixing device is provided for mixing the discharge volumetric flow (42) with an air volumetric flow (28), in particular an exhaust air volumetric flow, and that the mixing device (44) has a wall (47), which delimits a defined open thorough-mixing space (45) for the mixing of the discharge volumetric flow (42) with the air volumetric flow (28), the wall (47) delimiting only a subregion of the thorough-mixing space (45), and the region of the mixing device (44) not delimited by the wall (47) forming an entry region (48) for the two volumetric flows.

12 Claims, 4 Drawing Sheets

(56) References Cited

U.S. PATENT DOCUMENTS

| | | | |
|---|---|---|---|
| 2004/0013923 A1 | 1/2004 | Molter et al. | |
| 2006/0263658 A1 | 11/2006 | Yanagi et al. | |
| 2007/0240431 A1* | 10/2007 | Hoshi | B60K 1/04 62/61 |
| 2008/0160360 A1* | 7/2008 | Fennimore | H01M 8/04783 429/408 |
| 2011/0081584 A1* | 4/2011 | Nakayama | H01M 8/04761 429/414 |
| 2012/0115055 A1* | 5/2012 | Wake | H01M 8/04141 429/414 |
| 2013/0149627 A1* | 6/2013 | Nishimura | H01M 8/04228 429/444 |
| 2018/0294497 A1* | 10/2018 | Asai | H01M 8/04 |
| 2019/0036135 A1* | 1/2019 | Hierl | C25B 15/08 |

FOREIGN PATENT DOCUMENTS

| | | |
|---|---|---|
| WO | WO 2017/089468 | 6/2017 |
| WO | WO 2017/089469 | 6/2017 |

* cited by examiner

PURGING SYSTEM AND USE THEREOF IN AN ENERGY SYSTEM

REFERENCE TO PENDING PRIOR PATENT APPLICATIONS

This patent application claims benefit of International (PCT) Patent Application No. PCT/EP2019/086014, filed 18 Dec. 2019 by HPS Home Power Solutions GmbH for PURGING SYSTEM AND USE THEREOF IN AN ENERGY SYSTEM, which in turn claims benefit of German Patent Application No. DE 10 2018 133 201.7, filed 20 Dec. 2018.

The two (2) above-identified patent applications are hereby incorporated herein by reference.

FIELD OF THE INVENTION

The present invention first relates to a purging system for purging components of an energy system according to the preamble of the independent claim 1. Furthermore, the invention relates to an energy system according to the preamble of the independent claim 11. Finally, the invention also relates to a method for operating a purging system in an energy system as well as to a special use of a mixing device of a purging system.

BACKGROUND OF THE INVENTION

Energy systems of the generic type are already known in many ways in the prior art. Such systems are commonly used to generate and provide energy for a wide variety of fields of application.

In a known type of such energy systems, energy is generated in a first energy source. The energy generated may be, for example, hydrogen. The hydrogen is produced, for example, in an electrolysis device and it is stored in a second energy source device, which is, for example, a storage device. This is, for example, a first mode of operation of the energy system. During the operation of the energy system, the hydrogen is withdrawn from the storage device and consumed in a first energy sink device. This is, for example, a second mode of operation of the energy system. Such a first energy sink device is, for example, a fuel cell device. Usually, the aforementioned components of the energy system are spatially separated from one another and are connected to one another via a connecting line device. Both of the aforementioned modes of operation usually require a different pressure level. While pressures of 20 to 60 bar prevail in the first mode of operation with the electrolysis, for the operation of the fuel cell device in the second mode of operation, pressures of less than 20 bar are required. For example, such a known energy system is described in DE 103 07 112 A1.

Within the scope of operation of such an energy system, it is necessary to regularly purge the fuel cell device, in particular on its anode side and/or the electrolysis device, in particular on its cathode side. Such a rinse, also referred to as "purging", is particularly necessary in order to lead away undesired foreign gas components, and liquid water which accumulates locally in the cell structures and which negatively influences the performance and the service life of the fuel cell device and/or of the electrolysis device, at regular intervals or depending on the operating modes. The purging is carried out with the aid of a suitable purging system.

A known purging system, from which the present invention departs, is disclosed and described in WO 2017/089466 A1 of the applicant. According to this known solution, a purging volume flow loaded with hydrogen is generated during the purging process and is initially stored in a storage chamber assigned to a purging device. Subsequently, the purging volume flow loaded with hydrogen is discharged from the storage chamber to the environment as a discharge volume flow via an outflow device.

For example, the fuel cell device and the electrolysis device as well as the purging system are components of a first subsystem of the energy system, which is accommodated, for example, in a system cabinet. The discharge volume flow is delivered to the environment in such a way that it flows via the outflow device into a specific region designated as a mixing zone. This region is specially designed for this purpose. This is because the discharge volume flow, due to its hydrogen content, which at this point is a pollutant gas, is an explosive gas mixture, so that in the region of the outlet no ignition sources must be located in the vicinity thereof. In order to bring the hydrogen mixture to a value below the lower explosion rate, it is necessary to dilute the hydrogen-loaded discharge volume flow to such an extent that the hydrogen content in the volume flow slips below the lower explosion limit. This is achieved, for example, by mixing the discharge volume flow in the mixing zone with a further air volume flow. This further air volume flow is, for example, an exhaust air volume flow, which arises at a different location during operation of the energy system.

The purging process described in the known solution already works quite well. Nevertheless, there is always the need to further modify the energy system to the effect that any hazards emanating from escaping hydrogen, in particular with regard to the risk of explosions, are reliably and at any point in time excluded.

Based on the known solution, suitable developments could, for example, comprise, that an explicit fan is used for the dilution air volume flow. However, a fan represents a further system component which requires energy and which causes additional costs and requires installation space. In addition, such fans would have to be designed to be sucking and explosion-proof, since they basically represent an ignition source. The use of additional fans is therefore disadvantageous. Furthermore, in addition to air monitoring, a hydrogen sensor could also be used. However, this would complicate the operation of the purging system and thus of the energy system. A hydrogen sensor can only measure a mixed concentration, whereby statements to the actual hydrogen concentration within the mixing zone can be made upon detailed knowledge of the flow ratios only. However, this is too inaccurate. In addition, large safety factors must be used. Error triggering is also possible. The use of a hydrogen sensor also does not provide any measure for reducing the hydrogen content in the discharge volume flow. The use of a gas monitoring device is usually subject to a maintenance interval. For example, functional tests are common every 4 months.

SUMMARY OF THE INVENTION

Departing from the above-mentioned state of the art, the present invention is therefore based on the object of reducing the risk of explosion by hydrogen in the discharge volume flow after a purging process, by means of simple constructive and cost-effective measures, to further advantageously modify a purging system of the generic type.

According to the invention, this object is achieved by the purging system comprising the features according to the independent claim 1, which represents the first aspect of the invention, by the energy system described below, which represents the second aspect of the invention, by the method for operating a purging system in an energy system as described below, which represents the third aspect of the invention, and by the specific use of a mixing device, which represents the fourth aspect of the present invention. Further features and details of the invention become apparent from the dependent claims, from the description and from the drawings. In this context, features and details which are disclosed in connection with the first aspect of the invention apply to their full extent also in connection with the second, third and fourth aspect of the invention respectively, and vice versa, so that with regard to the disclosure of one aspect of the invention, full reference is always made to the other aspects of the invention respectively.

The basic idea of the present invention is that, by means of a simple construction, a region of targeted mixing of hazardous gas, which is in particular the hydrogen-containing discharge volume flow, is created.

The invention is first directed to a purging system, by means of which individual components of an energy system are purged. The purging system is, in particular, an entity being composed of a plurality of components, the components being connected to one another to form a dedicated unit. The purging system is preferably a component of an energy system. The energy system is, in turn, in particular an entity composed of a plurality of components, wherein the components are connected to one another to form a dedicated unit. In the present case, the energy system is preferably a system for generating or providing energy, preferably electrical energy. Generally, the invention is not limited to certain types of energy systems. In the following, different preferred embodiments are described with this regard.

According to a preferred embodiment, the energy system is a house energy system. House energy systems are known in principle from the state of the art and are used to supply houses, for example low-energy houses, passive houses or zero-energy houses, with energy in the form of heat and in particular in the form of current, for example current from regenerative energy sources such as, for example, photovoltaic (PV) generators or small wind power plants. Such a house energy system provides the basis that the energy requirement of a house, in particular of a low-energy house, a passive house or a zero-energy house, can be completely covered from renewable energy sources both with regard to the current and heat requirement and thus consists of complete CO2 freedom during operation. At least however, the electricity demand of a house can be covered almost completely from renewable energy sources, in particular by means of a PV generator and/or a small wind power plant, in the sense of seeking an increase in self-consumption.

Such a house energy system is described, for example, in patent applications WO 2017/089468 A1 and WO 2017/089469 A1 of the applicants, the disclosure of which being incorporated into the description of the present patent application.

According to a preferred embodiment, a house power system of the type mentioned comprises the following basic features:
- a DC feed point, preferably designed for a nominal voltage of 48 volts, and/or an AC feed point, preferably designed for a voltage of 230 volts or 110 volts, wherein the DC feed point and/or the AC feed point, during operation, is connected at least temporarily to an electrical equipment having a consumption power,
- a PV generator which is electrically connected at least temporarily to the DC feed point, in order to generate an electrical PV power,
- a fuel cell unit which is electrically connected at least temporarily to the DC feed point or to the AC feed point in order to generate an electrical fuel cell power,
- an electrolysis unit electrically connected to the DC feed point for generating hydrogen to be consumed by the fuel cell unit, wherein the electrolysis unit is supplied with an electrical electrolysis input power during operation,
- a hydrogen tank, in particular as a long-term energy storing device, which is, at least temporarily, fluidically connected to the fuel cell unit and to the electrolysis unit and which is provided to store hydrogen to be generated by means of the electrolysis unit and to be consumed by the fuel cell unit,
- a storage battery unit, in particular as a short-term energy storage device, which is electrically connected or to be connected to the DC feed point, such that an electrical PV power and an electrical fuel cell power can be stored in the storage battery unit, and an electrical electrolysis input power and a consumption power can be withdrawn from the storage battery unit; and
- a control module for controlling the house power plant.

According to the first aspect of the invention, a purging system is provided which comprises the features of independent claim 1.

The purging system is provided in order to purge at least one energy source device and/or at least one energy sink device. These two components represent components of an energy system, which is described in the general description further above and in connection with the second aspect of the invention in detail further below, so that at this point full reference is also made in this regard to the corresponding disclosures there. According to a preferred embodiment, by means of which the invention is explained by way of example, the energy source device is preferably an electrolysis device, in particular for producing hydrogen. The energy sink device is preferably a fuel cell device.

The purging system comprises a purging device which is provided in such a way that it is capable of generating a discharge volume flow during a purging process. This discharge volume flow, which contains hydrogen, which represents a hazardous gas at this point, arises, for example, when the fuel cell device, in particular on the anode side thereof, and/or the electrolysis device, in particular on the cathode side thereof, is/are purged.

Such a flushing system, which is referred to as a "purging system" and which preferably comprises a number of different components, is explained in more detail below. The flushing itself is also referred to as "purging".

According to a preferred embodiment, the purging system comprises a purging device with a purging channel which comprises a first and at least one second purging channel section which can be fluidically connected to one another via a purge valve of the purging device, and further comprising a buffer storage device which is fluidically connected to the purging channel and is connected downstream of the purge valve and has at least one storage chamber which is provided to temporarily store a pulse-like with a purge mass flow from the fuel cell device and/or from the electrolysis device, fluid mass to be discharged, in such a way that said fluid mass can be discharged from a discharge device which is fluidically connected to the second purge channel section together with a discharge mass flow which is the discharge volume flow, which is less than the flushing mass flow. The discharge mass flow, which typically consists of large parts of hydrogen, can be admixed to an air mass flow, which is the air volume flow, so that the resulting gas mixture has a hydrogen concentration in all operating states clearly below the lower ignition limit of hydrogen in air. This dilution effect allows safe operation of the energy system. By virtue of the fact that a buffer storage device having a storage chamber is connected downstream of the purge valve, a fluid mass discharged in a pulsed manner with the purging mass flow can be discharged with a discharge mass flow, which is lower than the purge mass flow. This advantageously results in a smoothing of the pulse-like purging mass flow, which advantageously leads to the avoidance of critical hydrogen concentrations with simultaneously lower exhaust air mass flow.

According to a preferred embodiment, the storage chamber is expandable. The storage chamber can be expandable by the pulse-like with the purging mass flow from the fuel cell device and/or the electrolysis device, to be discharged fluid mass. The storage chamber is particularly preferably designed as a bellows which can receive a respective purging volume, that is to say the purging mass flow multiplied by a pulse duration of a purge, without, or with only a slight build-up of counterpressure. A storage chamber designed as a bellows can be designed to be moved back into its unexpanded state by a gravitational force, in particular exclusively by a gravitational force of a preferably freely movable end plate of the bellows. For the targeted adaptation of the force which moves the bellows back into its unexpanded state, and thus the discharge time and the pressure profile of the bellows buffer over time, the gravitational force can also be amplified or partially compensated by an attached spring device.

As already mentioned, the discharge volume flow is provided from the storage chamber, which is designed in particular as a bellows. However, the present invention is not limited to this embodiment. According to a different embodiment, the storage chamber can be designed as a bubble storage device or as a piston storage device. As an alternative to an expandable design of the storage chamber, however, the storage chamber can also be designed as a rigid pressure vessel, in which the storage chamber is designed in such a way that the pulse-like with the purging mass flow from the fuel cell device and/or the electrolysis device, to be discharged fluid mass leads to a pressure increase in the storage chamber.

The purge system may be configured to adjust a purge volume flow to a discharge volume flow of less than 10%, preferably less than 3% of the purge volume flow. The discharge volume flow to the environment is preferably discharged via an exhaust air volume flow which is at least 50 Nm3/h and which is also referred to as the exhaust air volume flow. Preferably, a nominal operating pressure of the storage chamber is less than 50 millibar, preferably less than 20 millibar above an operating pressure of the exhaust air volume flow.

In other words, the purging system has, in particular, the function that an air volume washes around the outlet of the purging chamber, for example a purge-bellows outlet, and diluting the hydrogen, which is purged out of the electrolysis device and/or the fuel cell device. The purging process is also referred to as purge in the specialist jargon and is necessary for the safe operation of both modules, in which the respective stacks are freed of impurities and moisture by flushing with pure hydrogen. The targeted admixing to an air volume flow, which may be, for example, an exhaust air volume flow, precludes the formation of an explosive atmosphere. Next, the exhaust air can be guided via a cooling device, for example an air-water heat exchanger. There, either the excess heat from the electrolysis device can be removed or the warm exhaust air can be used for heating water in a hygienic-hot-water reservoir. The resulting exhaust air is conducted to the outside.

Such a purging system is disclosed and described, for example, in the applicant's patent application WO 2017/089466 A1, the disclosure of which being incorporated into the description of the present patent application.

According to the invention it is provided, that the purging system comprises a mixing device being arranged downstream of the purging device in the flow direction of the exhaust volume flow. The mixing device is, in particular, a construction for mixing the exhaust volume flow with a further air volume flow. The further air volume flow is preferably an air volume flow which is produced at a different location during operation of the energy system, for example an exhaust air volume flow. By mixing of the two volume flows in the mixing device, the effect occurs that the hydrogen-loaded discharge volume flow is diluted to such an extent that the hydrogen content is pushed below the lower explosion limit, preferably to a content of less than 10,000 ppm (1 vol. %).

The mixing device is preferably a component which is assigned to the purging system. It is therefore preferably regarded as a component of the purging system. However, the mixing device can equally well be arranged downstream of the purging system. In this case, the mixing device would no longer be a component of the purging system, but rather as an independent component which, however, interacts with the purging system.

According to the invention, the mixing device comprises a wall which delimits a defined open mixing space for mixing the exhaust volume flow with the air volume flow, in particular with defined flow conditions. The space which is partially delimited by the wall of the mixing device is, in particular, the location where mixing takes place. Thus, the term "space" is to be understood in particular as meaning both physically, that is to say with a physical limitation, and also functionally. The space is only partially bounded by the wall. In the case of such a space one speaks of an open space, since the space is surrounded and bounded only partially and in regions by the wall. The wall has the function of spatially delimiting or limiting the mixing space. An open mixing space is distinguished in particular by the fact that it is opened or open as large as possible and/or open at as many points as possible, so that the various volume flows can mix well. Different preferred exemplary embodiments thereof are explained in more detail in the further course of the description.

The purging system preferably comprises an outflow device which cooperates with the mixing device. In this context, cooperating means in particular, that the outflow device interacts or cooperates with the mixing device. In particular, provision is made here for the outflow device and the mixing device to be arranged close to one another in such a way that the discharge volume flow from the outflow device can enter the mixing device. The invention is not limited to specific embodiments for the outflow device. For example, the outflow device can be configured in the form of a diaphragm, throttle, nozzle, jet pump, Venturi nozzle or as a recombiner. The outflow device has, in particular, the function of limiting the discharge volume flow entering the mixing space or of providing a defined discharge volume flow for the entry into the mixing space.

According to a preferred embodiment, the mixing device comprises a distribution device, which is configured and provided for distributing the discharge volume flow in the mixing chamber. The basic function of this distribution device is that it distributes the discharge volume flow in the mixing space in such a way that it can mix as well as possible and preferably uniformly with the air volume flow. Preferably, the distribution device interacts with the outflow device, preferably in such a way that the distribution device directly adjoins the outflow device. The distribution device is preferably arranged or formed at least partially in the mixing chamber. In a preferred embodiment, the distribution device is arranged entirely in the mixing space. In another embodiment, the distribution device is only partially arranged in the mixing chamber. This means that the distribution device protrudes partially out of the mixing chamber.

The invention is not limited to specific embodiments of this distribution device.

According to a preferred embodiment, the distribution device is configured in the form of an, in particular elongated, tube or profile element, which extends at least partially, preferably over the entire length or approximately the entire length of the mixing space.

According to another preferred embodiment, the distribution device consists of a porous material. The discharge volume flow then penetrates the pores of the distribution device. Thus, the distribution device is capable to control the flow of the discharge volume flow, for example in a preferred flow direction, and/or to limit and/or optionally also to dam it. This makes it possible that the discharge volume flow is distributed as uniformly as possible to the mixing space and/or possibly also enters the mixing space at reduced pressure, so that it can mix with the air volume flow as uniformly as possible in the mixing chamber.

In order that the mixing space of the mixing device is designed to be as open as possible, it is realized according to the invention, that the wall of the mixing device delimits only a partial region of the mixing chamber. The portion of the mixing device, which is not limited by the wall, forms an inlet region for the discharge volume flow and the air volume flow. According to the invention it is provided that the wall of the mixing device limits the mixing space to less than 90%, preferably to less than 80%, preferably to less than 70%, preferably to less than 60%, preferably to less than 50%.

Depending on the configuration, the entrance area can be designed in such a way that the discharge volume flow and the air volume flow enter the mixing space separately from one another in each case via their own entrance partial areas.

According to another embodiment, the discharge volume flow and the air volume flow can, at least in part, enter into the mixing space via a common entrance area.

According to a preferred development, the mixing device comprises at least one element for increasing the residence time of the discharge volume flow in the mixing device. This increases the residence time of the hydrogen within the "protected" environment of the mixing device and thus also increases the time for mixing. The invention is not limited to specific types of such elements. For example, it may be a nonwoven element, a styrofoam element, an adhesive bond, or the like.

The present invention is not limited to specific embodiments, as the mixing device has to be designed in a constructive manner. In the following, a number of preferred exemplary embodiments will now be described, without the invention being restricted to these specific examples.

For example, the mixing device can be hood-shaped or umbrella-shaped or shell-shaped, or the mixing device comprises an arc-shaped wall. However, the mixing device can also take the form of a curvature or a dome or an arcuate course. Other shapes, such as, for example, those of a bell, in particular a cheese bell, a funnel, a pyramid, or the like, are likewise conceivable. The contour of the mixing device is realized in particular by a corresponding course or a corresponding design of the wall of the mixing device.

According to another preferred embodiment, the mixing device is designed in the form of a fraction of a tube, wherein the wall of the tube fraction forms the mixing space. Therein, for example, a distribution device as described above, for example in the form of a tube made of porous material, can be located. A tube is in particular an elongated hollow body which has, in particular, a length which is greater, preferably by a multiple greater, than its cross-section. A full pipe is a pipe, the wall of which surrounds the interior of the pipe from all sides and completely. The fraction of a tube is a partial segment of such a full tube.

For example, the mixing device may be in the form of a quarter tube, or a third tube or a three-quarter tube or a two-third tube. In a preferred embodiment, the mixing device is in the form of a half-tube, wherein the wall of the half-tube delimits the mixing chamber.

The discharge volume flow is preferably slowed down by the path in the mixing device. This is therefore preferably as long as possible, for example as a half-tube as long as possible, and with a large mixing surface.

In such a case, the mixing device preferably comprises a first open end face and/or an open bottom face. The first end face and/or the open bottom face serve, in particular, as an entry point or entry face or as an entry region for the discharge volume flow into the mixing space of the mixing device. The open underside serves, in particular, as an entry point or entry surface or entry region for the air volume flow, with which the discharge volume flow mixes. The underside of the half-tubular mixing device represents in particular the ground side or base side thereof. The surface formed by the underside, which is delimited by the free end regions of the curved wall, forms the plane, from which the curved wall of the half-tube extends upwards or curves. Alternatively, or additionally, the half-tube also comprises an open second end face, which is configured in particular as an output side for an exhaust air flow, consisting of the mixed discharge volume flow and the air volume flow.

Instead of a tube, in particular a half-tube, the mixing device can also be in the form of a differently shaped profile element fraction, for example a half-profile element.

The contour of the mixing device preferably presets a shape for a hypothetical volume with regard to the mixing of the discharge volume flow with the exhaust volume flow, in particular with defined flow ratios. A hypothetical volume is in particular one which is based on an assumption or submission. In the hypothetical volume there are preferably no ignition sources. This applies in particular when the mixing device is installed in an energy system. In the case of a half-tube mixing device, the hypothetical volume preferably has the shape of a cylinder which surrounds the mixing device on all sides.

According to the second aspect of the invention, an energy system is provided which comprises the features of an energy source device, which is configured in particular as an electrolysis device, and/or comprising an energy sink device, which is configured in particular as a fuel cell device, and comprising a purging system for purging the energy source device and/or the energy sink device.

The system according to the invention is in particular a house energy system.

The energy system comprises an energy source device, which is configured in particular as an electrolysis device, preferably for producing hydrogen. Additionally, or alternatively, the energy system comprises an energy sink device which is configured, in particular, as a fuel cell device. In addition, the energy system optionally comprises a second energy source device, which is configured in particular as a high-pressure storage device, in particular for storing hydrogen, and/or a second energy sink device, which is preferably configured as a medium-pressure storage device, in particular for the intermediate storage of hydrogen.

The energy system also comprises a purging system for purging the energy source device and/or the energy sink device, said flushing system being configured according to the first aspect of the invention. In order to describe the construction and the mode of operation of the energy system, reference is also made in full to the general description further above, as well as to the description of the purging system according to the invention.

According to a preferred embodiment, the energy system comprises a first subsystem, which is arranged in particular in a system cabinet. The energy source device and/or the energy sink device as well as the purging system are then components of the first subsystem. The first subsystem comprises a mixing zone which is provided in such a way that the discharge volume flow and the air flow, in particular the exhaust air volume flow, mixed or can be mixed therein. The mixing device is preferably arranged or formed in the mixing zone.

The energy system preferably comprises at least one cooler device, which has already been generally described above and which is configured in particular as an emergency cooler. The mixing device is preferably arranged or formed below the cooler device.

According to the third aspect of the invention, a method for operating a purging system is provided which comprises the features of a discharge volume flow, which has been generated in the purging system during a purging process, is led into the defined open mixing space delimited by the wall of the mixing device, is mixed there with an air volume flow, in particular an exhaust air volume flow, and is discharged from there as an exhaust air volume flow.

According to the method, a purging system according to the first aspect of the invention is operated. The purging system is in particular a component of an energy system according to the second aspect of the invention. For the operation of the method, in order to avoid repetitions, full reference is also made to the above description of the first and second aspects of the invention, as well as to the general description above.

According to the method of the invention, a discharge volume flow generated in the purging system during a purging process is introduced into the open mixing chamber, which is defined by the wall of the mixing device, where it is mixed with an air volume flow, in particular an exhaust air volume flow, and is discharged therefrom as an exhaust air volume flow. The discharge volume flow preferably flows through a distribution device, as described above, in the mixing chamber, for example a tube made of porous material. The air volume flow is in particular one which is produced at a different point during operation of the energy system.

According to the fourth aspect of the invention, a mixing device is used which comprises a wall that delimits a defined open mixing space, wherein the wall delimits the mixing space to less than 90%, and the region of the mixing device that is not delimited by the wall, forms an entrance area for the at least two volume flows, in order to mix a discharge volume flow, that has been generated by a purging system during a purging process of an energy source device and/or an energy sink device of an energy system, with an air volume flow, in particular an exhaust air volume flow, generated by the energy system at a different point. With regard to the configuration of the mixing device, in order to avoid repetitions, full reference is made to the corresponding description with regard to the first to third aspects of the invention as well as to the general description above.

Accordingly, a mixing device is used which comprises a wall which delimits a defined open mixing space, wherein the wall delimits the mixing space to less than 90%, and the region of the mixing device which is not delimited by the wall forms an inlet region for at least two volume flows. This mixing device is used in order to mix a discharge volume flow, that has been generated from a purging system, in particular a purging system according to the first aspect of the invention, during a purging procedure of an energy source device and/or of an energy sink device of an energy system, in particular an energy system according to the second aspect of the invention, with an air volume flow, in particular an exhaust volume flow, that has been generated from the energy system at a different point. The use according to the invention provides, in particular, that the mixing of the discharge volume flow, which contains hydrogen, which represents a hazardous gas at this point, is diluted in a sufficient manner.

The present invention proceeds according to the various aspects of the invention in particular from the problem position, that the discharge of hydrogen into an air volume flow must take place below the lower explosion limit. An explosive atmosphere is always formed, which is to be classified as threatening. A dilution of the hydrogen, which is therefore to be carried out, must take place in a state in which no specific volume flow can be used. The required volume flow should also be as low as possible in order to have a very low energy consumption.

The present invention therefore consists in particular in that by means of a construction, namely the mixing device, in particular the definition of a hypothetical volume can be realized, which is sufficiently ventilated so that the maintenance of an average concentration of the hazardous gas remains <50% of the lower explosion limit and the volume considered remains at <0.1 m³. In the case of high ventilation with good availability, a region which is not hazardous to explosion is thus formed from a potential zone 0. As an air flow which is used for mixing with the discharge volume flow, for example an exhaust air volume flow of the energy system, for example of the house energy system, can be used. Possible ignition sources can be provided in the subsequent flow path downstream of the mixing device. The hydrogen-containing discharge volume flow is introduced from the purging system, for example a purging chamber, into the mixing device, and there undergoes an increased residence time in a defined open space for mixing. For safety, no ignition sources should be located within the hypothetical volume.

A number of advantages can be realized with the present invention. Thus, a simple constructive solution can be provided with defined inflow conditions in the case of a fixed surrounding ventilation space. Additional hydrogen sensors are not required. The contour of the mixing device gives the hypothetical volume a shape.

BRIEF DESCRIPTION OF THE DRAWINGS

The invention will now be explained in more detail with reference to an exemplary embodiment with reference to the accompanying drawings, wherein.

Figure 1:
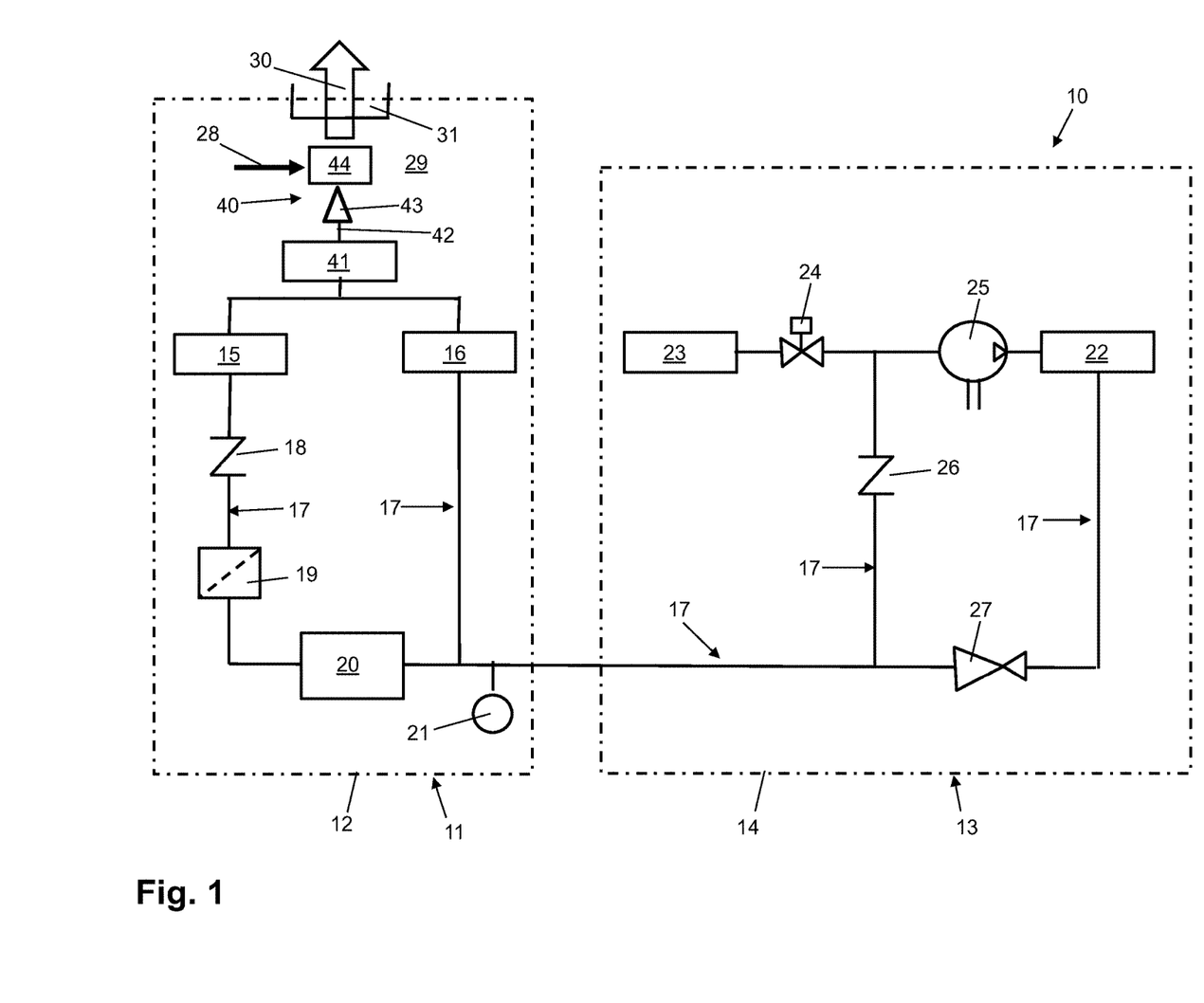
FIG. 1 is a schematic view of an energy system according to the invention with a purging system according to the invention.

FIGS. 1 to 4 schematically depict an energy system 10, which is used as a house energy system. In FIG. 1, the basic structure of the energy system 10 is first described.

DETAILED DESCRIPTION OF THE PREFERRED EMBODIMENTS

As can be seen from FIG. 1, the energy system 10 initially comprises a first subsystem 11, which is configured as an inner system. This means that the first subsystem 11 is located inside the house. The individual components of the first subsystem 11 are accommodated in a first system cabinet 12. In addition, the energy system 10 comprises a second subsystem 13 in the form of an outer system. This means that the second subsystem 13 is located outside the house. The second subsystem 13 also comprises a series of different components housed in a second system cabinet 14.

The first subsystem 11 comprises a first energy source device 15, which is an electrolysis device for producing hydrogen. In addition, the first subsystem 11 comprises a first energy sink device 16, which is a fuel cell device. The second sub-system 13 comprises a second energy source device 22, which is a high-pressure storage device. The hydrogen produced in the electrolysis device is stored in the high-pressure storage device at up to 700 bar. In addition, the second subsystem 13 comprises a second energy sink device 23 in the form of a medium-pressure storage device, in which the hydrogen produced is temporarily stored at pressures between 20 and 60 bar, before it gets finally stored by the high-pressure storage device.

The individual components of the energy system 10 are connected to one another via a connecting line device 17, which consists of a number of different line sections. Individual line sections are designed as so-called bidirectional line sections.

For purging the first energy source device 15 and/or the first energy sink device 16, a purging system 40 is provided, the structure and operation of which will be described in greater detail below.

The hydrogen produced in the first energy source device 15 by means of electrolysis leaves the first energy source device 15 via a line section of the connecting line device 17, in which, in the flow direction of the produced hydrogen, can be provided for example a check valve device 18 and subsequently a filter device 19 and a dryer device 20, in which the produced hydrogen gets filtered and dried. The filter device 19 and the dryer device 20 can alternatively also be located in the second subsystem 13.

From the dryer device 20, the produced hydrogen produced flows via a further line section of the connecting line device 17 to a further check valve device 26 in the second subsystem 13. From there, the produced hydrogen flows into the second energy sink device 23 functioning as a medium-pressure storage device, which is connected to the connecting line device 17 via a valve device 24, which in particular is provided as a shut-off valve, for example in the form of a solenoid valve. Upstream of the second energy source device 22, which is configured as the high-pressure storage device, a compressor device, in particular in the form of a piston compressor, is provided in the connecting line device 17. The hydrogen temporarily stored in the second energy sink device 23 is stored in the second energy source device 22 by actuating the compressor device 25.

This production process of the hydrogen up to its storage in the second energy source device 22 represents a first mode of operation of the energy system 10. In this first mode of operation of the energy system 10, connecting line device 17 has a pressure of 20 to 60 bar. Such a pressure also prevails in the second energy sink device 23. By means of the compressor device 25, the hydrogen which is withdrawn from the second energy sink device 23, which is a buffer storage device, is compressed to such an extent that it can be stored at pressures of up to 700 bar in the second energy source device 22, which is a high-pressure storage device.

The hydrogen stored in the second energy source device 22 is used for the operation of the first energy sink device 16 in the form of the fuel cell device. The operation of the fuel cell device takes place in the second mode of operation of the energy system 10. However, the fuel cell device can only operate at pressures of less than 20 bar. In the second mode of operation of the energy system 10, the hydrogen is removed from the second energy source device 22 and gets expanded via an expansion device 27 in the form of a pressure reducer before it enters the first energy sink device 16 designed as a fuel cell device. To measure the pressure, at least one pressure measuring device 21, for example in the form of a pressure sensor, is provided.

The energy system 10 illustrated in FIGS. 1 to 4 represents a partial area of an overall house energy system, which is a multi-hybrid house energy storage system that is electrically autonomous and that is completely based on renewable energies.

The multi-hybrid house energy storage system makes it possible that the electrical energy generated by a photovoltaic (PV) system, a small wind power plant or the like is distributed as required to the entire year. The system acts as an island system independent of the electrical network. Rather, the system is to ensure the electrical autarchy of the house, so that no electrical energy has to be drawn from the power grid over the entire year.

The primary task of the house power system is to make available the recovered electrical energy from photovoltaic (PV) modules or the like to the consumer in the household. Secondary, electrical energy excesses can be temporarily stored in a battery short-term storage device at times of low load or high irradiation. Tertiary, the electrical energy can be medium to long-term stored in the hydrogen long-term storage as gaseous hydrogen for times of low irradiation such as night, winter or the like, and can be needs-based made available again at any time by means of a fuel cell.

Besides to energy-related tasks, the system also functions as a controlled living room ventilation by means of a built-in ventilation device.

The hydrogen produced in the electrolysis device flows via the hydrogen line into the outwardly provided pressure storage system.

In the event of a lack of or insufficient PV energy, energy is supplied from the battery to cover the consumer load. If the energy stored in the short-term storage device is not sufficient, the fuel cell device can satisfy the additional electrical energy requirement. In the fuel cell operation, the hydrogen flows from the pressure storage system to the fuel cell device via the hydrogen line.

The simultaneous operation of the fuel line device and the electrolysis device is excluded. The entire system is operated centrally via an energy manager with predictive energy management.

In principle, the second subsystem is provided for operation in the outer region, but can also be erected and operated within a special region of the house under certain conditions.

During the operation of energy system 10, it is necessary that the first energy source device 15 in the form of the electrolysis device as well as the first energy sink device 16 in the form of the fuel cell device get purged at regular terms, whereby the fuel cell device is particularly purged on the anode side, and the electrolysis device is particularly purged on the cathode side. Purging is necessary, in particular, in order to discharge, at regular intervals or as a function of the operating states, undesired foreign gas components, and liquid water which accumulates locally in the cell structures, which can negatively influence the performance and the service life of the fuel cell device and/or of the electrolysis device.

Purging takes place with the aid of the purging system 40. In a manner known per se, the purging system 40 initially comprises a purging device 41 which, for example, can have at least one storage chamber, for example in the form of a bellows. During the purging process, a discharge volume flow 42 emerges from the purging device 41 that contains hydrogen, which at this point represents a hazardous gas. In principle, this forms an explosive atmosphere, so that it is necessary to reduce the discharge of hydrogen during the purging process below the explosion limit. This has hitherto been accomplished, for example, in that in a mixing zone 29 of the first system cabinet 12, which represents a zone designed and designed for this purpose, and which is equipped with corresponding safety measures, the hydrogen-containing discharge volume flow 42 is mixed with an air flow 28 of the energy system 10, in particular an exhaust volume flow, in such a way that the hydrogen content in the resulting exhaust air volume flow 30 only has a content below the explosion limit, for example of less than 2%. The discharge of the discharge volume stream 42 into the environment, that is to say into the mixing zone 29, is generally carried out by means of a suitable outflow device 43, which can be designed, for example, as a diaphragm, throttle, nozzle or the like. The exhaust air volume flow 30 produced in the course of mixing is discharged from the first subsystem 11 or the first system cabinet 12 respectively via an exhaust air channel 31 and can be provided for other functions, for example ventilation and/or heating and/or cooling.

In the flow direction of the discharge volume flow 42 downstream of the purging device 41, preferably in the mixing zone 29, a further component in the form of a mixing device 44 is provided. This mixing device 44 is illustrated in detail in FIGS. 2 to 4, which will now be explained in more detail.

The mixing device 44, which is provided in the first subsystem 11, preferably below a cooler device 32 in the form of an emergency cooler (FIG. 4), comprises a wall 47 which delimits a defined, open mixing space 45. However, the wall 47 of the mixing device 44 only delimits a partial region of the mixing space 45. The region of the mixing device 44, which is not limited by the wall 47, forms an entrance area 48 for the discharge volume flow 42 and for the air volume flow 28 into the mixing space 45.

Figure 2:
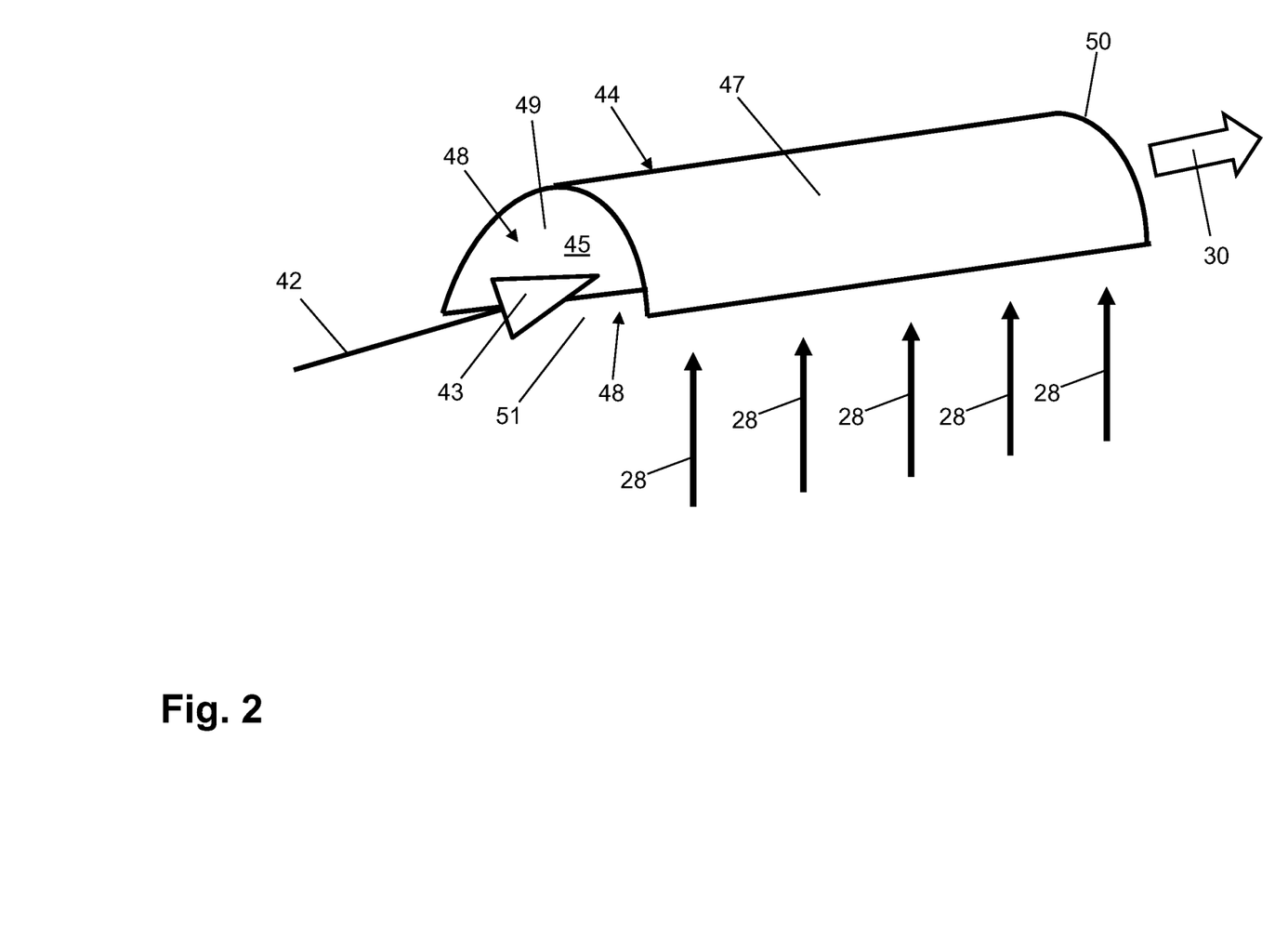
FIGS. 2 to 4 show three different views relating to the mixing device of the purging system.

In the exemplary embodiment shown, the mixing device 44 is configured in the form of a half-tube. This half-tube comprises a first open end face 49 and an open underside 51.

The end face 49 and/or the underside 51 serve as an entrance or inlet side for the hydrogen discharge volume flow 42 emerging from the outflow device 43. The open underside 51 of the half-tube mixing device 44, in particular, also provides an entrance or inlet surface, via which the air volume flow 28, in particular the exhaust air volume flow, enters the mixing space 45. In this case, the air volume flow 28 can enter over the entire open underside 51 into the mixing space 45. The configuration of the mixing device 44 creates a hypothetical volume 46 which defines the flushing zone.

In the embodiment illustrated in FIG. 2, the discharge volume flow 42 enters the mixing space 45 via the outflow device 43 in the entrance area 48, is distributed there and mixes with the air volume flow 28.

Figure 3:
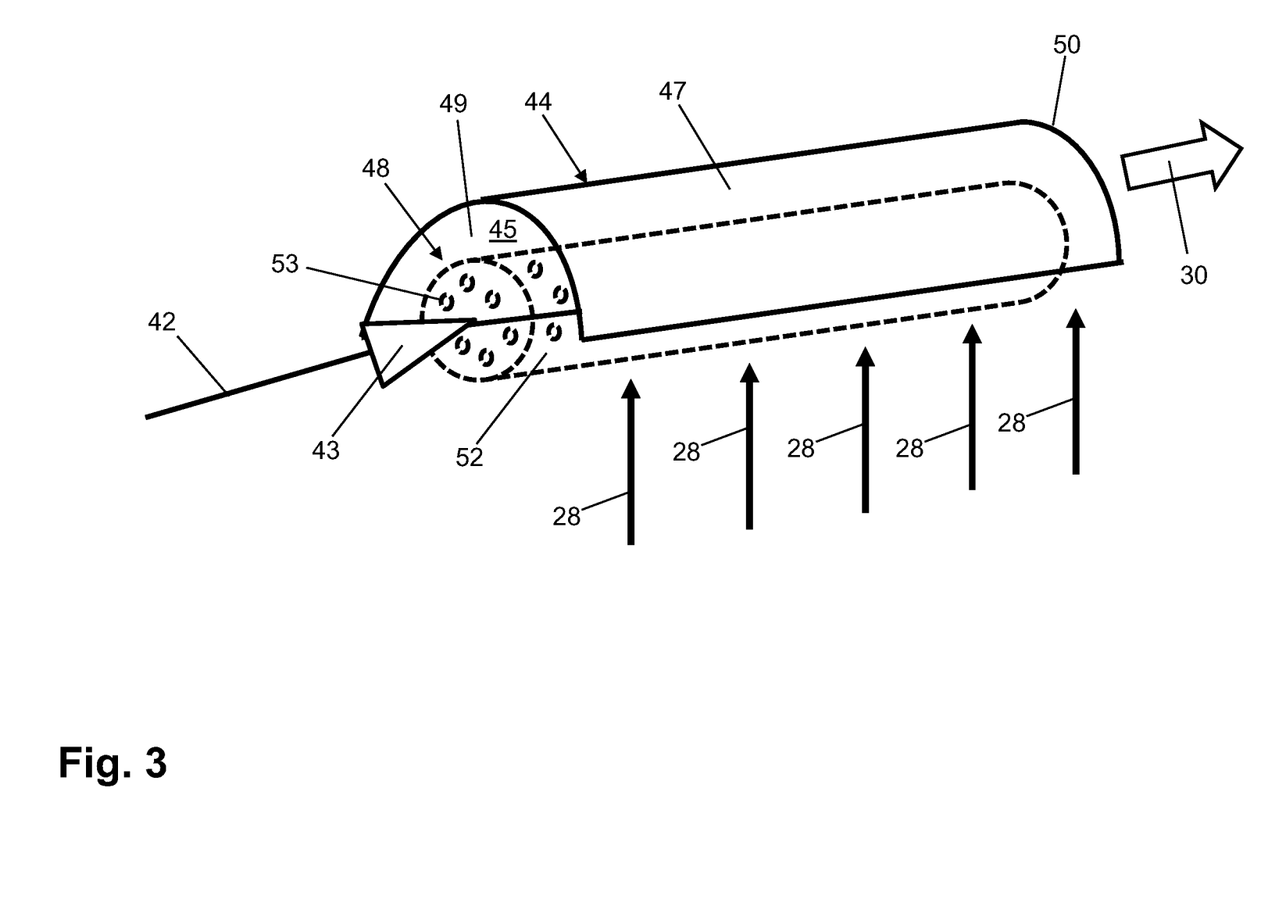

In order to influence the flow properties of the discharge volume flow 42 in the mixing space 45, in particular with regard to its flow properties, such as, for example, the flow profile, and in order to limit and/or to dam the flow of the discharge volume flow 42 in the mixing space 45, if necessary, a further component in the form of a distribution device 52 is preferably provided, which is illustrated in FIG. 3. The distribution device 52 is preferably provided in the form of a tube of porous material. In FIG. 3 some pores 53 are indicated schematically. The tubular distribution device 52, which is made of porous material, extends over the entire length or approximately the entire length of the mixing space 45. The distribution device 52 preferably interacts with the outflow device 43 in such a way that the discharge volume flow 42, which leaves the outflow device 43, enters directly or as far as possible directly into the distribution device 52. As a result of the porous material, the discharge volume flow 42 penetrates the distribution device 52, as a result of which its flow properties can be influenced. The discharge volume flow 42 then emerges via the pores 53 of the distribution device 52 at various points from the distribution device 52 and into the mixing space 45, where it mixes with the air volume flow 28 as uniformly as possible and preferably under a preferred reduced pressure.

Figure 4:
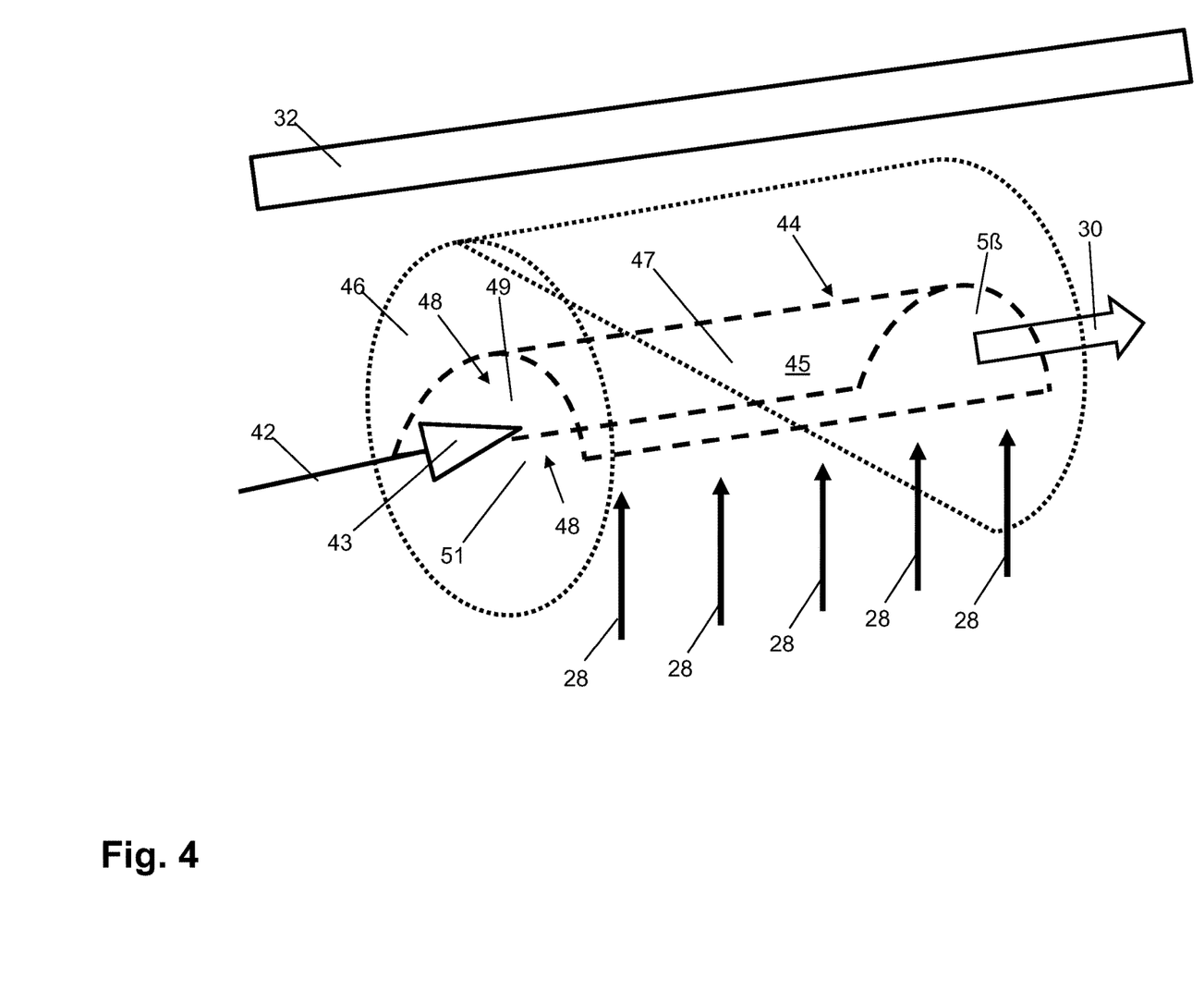

As can be seen from FIG. 4, the hypothetical volume 46 in this half-tube mixing means 44 is preferably in the form of a cylinder extending around the mixing device 44. In the embodiment shown, the exhaust air volume flow 30 which is generated during the mixing process, is discharged via a second open end face 50 of the mixing device 44. In principle, it doesn't matter for the present invention from where the exhaust air flow takes place. However, it is preferred that the exhaust air volume flow 30 be conducted via the cooler device 32, where the exhaust air volume flow 30, if necessary or desired, is either used for heating purposes or for cooling purposes.

As a result of the use of the mixing device 44, the hydrogen discharged from the purging device 41, in particular from the bellows, gets mixed by being subjected to an increase in the residence time in the defined open mixing space 45 of the mixing device 44. In this case, care must be taken that no ignition sources are located in the vicinity of the mixing device 44, preferably within the hypothetical volume 46.

The mixing has the effect that the hydrogen-loaded discharge volume flow 42 is diluted by mixing with the air volume flow 28, which is in particular an exhaust volume flow which arises or is generated elsewhere in the energy system 10, to such an extent that the hydrogen present in the discharge volume flow 42 falls below a critical content limit, which is, for example, less than 2%, in each case.

LIST OF REFERENCE NUMERALS

10 Energy system (house energy system)
11 First subsystem (inner system)
12 First system cabinet
13 Second subsystem (outer System)
14 Second system cabinet
15 First energy source device (electrolysis device)
16 First energy sink device (fuel cell device)
17 Connecting line device
18 Check valve device
19 Filter device
20 Dryer device
21 Pressure measuring device
22 Second energy source device (high-pressure storage device)
23 Second energy sink device (medium-pressure storage device)
24 Valve device
25 Compressor device
26 Check valve device
27 Expansion device (pressure reducer)
28 Air volume flow (exhaust air volume flow)
29 Mixing zone
30 Exhaust air volume flow
31 Exhaust air channel
32 Cooler device (emergency cooler)
40 Purging system
41 Purging device
42 Discharge volume flow
43 Outflow device
44 Mixing device
45 Mixing space
46 Hypothetical volume (purge zone)
47 Wall of the mixing device
48 Entrance area of the mixing device
49 First end face of the mixing device
50 Second end face of the mixing device
51 Underside of the mixing device
52 Distribution device
53 Pores

The invention claimed is:

1. A purging system (40), which is provided in order to purge at least one energy source device (15) and/or at least one energy sink device (16), comprising a purging device (41) which is configured to generate a discharge volume flow (42) during a purging process, wherein the purging system (40) comprises a mixing device (44) provided, in flow direction of the discharge volume flow, downstream from the purging device (41), the mixing device (44) being configured for mixing the discharge volume flow (42) with an air volume flow (28), characterized in that the mixing device (44) comprises a defined open mixing space (45) for mixing the discharge volume flow (42) with the air volume flow (28);

wherein the mixing device (44) comprises a wall (47) delimiting the mixing space (45);

wherein the wall (47) delimits only a partial region of the mixing space (45) of less than 90%;

wherein the region of the mixing device (44), which is not limited by the wall (47), forms an entrance area (48) for the discharge volume flow (42) and the air volume flow (28);

wherein the mixing device (44) is of a hood-shaped or an umbrella-shaped or a shell-shaped design, or the mixing device (44) comprises an arc-shaped wall, or the mixing device (44) is provided in the form of a fraction of a pipe, and wherein the wall delimits the mixing space (45);

wherein the mixing device (44) comprises a distribution device (52) for distributing the discharge volume flow (42) in the mixing space (45), and wherein the distribution device (52) is arranged at least partially in the mixing space (45).

2. The purging system according to claim 1, characterized in that the purging system (40) comprises an outflow device (43) which interacts with the mixing device (44).

3. The purging system according to claim 2, characterized in that the outflow device (43) is configured as a diaphragm, throttle, nozzle or pump.

4. The purging system according to claim 1, characterized in that the distribution device (52) is configured in the form of a pipe and/or in that the distribution device (52) consists at least partially of a porous material.

5. The purging system according to claim 1, characterized in that the purging device (41) comprises at least one storage chamber, in that the discharge volume flow (42) is or gets provided from the storage chamber, and in that the storage chamber is configured in particular as a bellows.

6. The purging system according to claim 1, characterized in that the mixing device (44) comprises a first open end face (49) and/or in that the mixing device (44) comprises an open underside (51) and/or in that the mixing device (44) comprises a second open end face (50).

7. The purging system according to claim 1, characterized in that the contour of the mixing device (44) presets a shape for a hypothetical volume (46) with regard to the mixing of the discharge volume flow (42) with the air volume flow (28).

8. An energy system (10), in particular house energy system, comprising an energy source device (15), which is configured in particular as an electrolysis device, and/or comprising an energy sink device (16), which is configured in particular as a fuel cell device, and comprising a purging system (40) for purging the energy source device (15) and/or the energy sink device (16), characterized in that the purging system (40) is configured according to claim 1.

9. The energy system according to claim 8, characterized in that the energy system (10) comprises a first subsystem (11), which is arranged in particular in a first system cabinet (12), in that the energy source device (15) and/or the energy sink device (16) and the purging system (40) are components of the first subsystem (11), in that the first subsystem (11) comprises a mixing zone (29) which is provided in such a way that therein the discharge volume flow (42) and the air volume flow (28), in particular the exhaust air volume flow, are mixed or can get mixed, and in that the mixing device (44) is arranged or provided in the mixing zone (29).

10. The energy system according to claim 8, characterized in that it comprises at least one cooler device (32), in that the cooler device (32) in particular is an emergency cooler, and in that the mixing device (44) is arranged or provided below the cooler device (32).

11. A method for operating a purging system (40) according to claim 1 characterized in that a discharge volume flow (42), which has been generated in the purging system (40) during a purging process, is led into the defined open mixing space (45) delimited by the wall (47) of the mixing device (44), is mixed there with an air volume flow (28), in particular an exhaust air volume flow, and is discharged from there as an exhaust air volume flow (30).

12. The purging system according to claim 1, wherein the mixing device (44) is in the form of a half-pipe.

\* \* \* \* \*